United States Patent

Leung et al.

[11] Patent Number: 5,964,862
[45] Date of Patent: Oct. 12, 1999

[54] EXECUTION UNIT AND METHOD FOR USING ARCHITECTURAL AND WORKING REGISTER FILES TO REDUCE OPERAND BYPASSES

[75] Inventors: Arthur T. Leung, Sunnyvale; Gary R. Lauterbach, Los Altos, both of Calif.

[73] Assignee: Sun Microsystems, Inc., Palo Alto, Calif.

[21] Appl. No.: 08/884,699

[22] Filed: Jun. 30, 1997

[51] Int. Cl.$^6$ .................................................. G06F 9/38
[52] U.S. Cl. ................. 712/23; 712/32; 712/214; 712/215
[58] Field of Search .................. 395/800.23, 800.01, 395/800.32, 800.28; 712/23, 1, 32, 28, 215, 214

[56] References Cited

U.S. PATENT DOCUMENTS

| | | | |
|---|---|---|---|
| 5,226,142 | 7/1993 | Vegesna et al. | 365/230.02 |
| 5,535,346 | 7/1996 | Thomas, Jr. | 395/393 |
| 5,630,157 | 5/1997 | Dwyer, III | 712/23 |
| 5,764,942 | 6/1998 | Kahle et al. | 395/390 |
| 5,790,827 | 8/1998 | Leung | 712/217 |

*Primary Examiner*—Meng-Ai T. An
*Assistant Examiner*—Mackly Monestime
*Attorney, Agent, or Firm*—William S. Galliani; Pennie & Edmonds LLP

[57] ABSTRACT

A CPU (central processing unit) of a computer. The CPU comprises a dispatch controller, a pipeline, a working register file, and an architectural register file. The dispatch controller dispatches instructions for execution and determines whether the dispatched instructions are valid or invalid. The pipeline executes the dispatched instructions using selected operands in the pipeline and generates operands in response. The working register file stores the generated operands before the executed instructions are determined to be valid or invalid by the dispatch controller such that the stored operands may be subsequently selected for use in executing an instruction in the pipeline. The architectural register file stores the generated operands for those of the executed instructions that are determined to be valid by the dispatch controller and transfer operands currently stored therein when one of the executed instructions is determined to be invalid by the dispatch logic. The working register file then stores the transferred operands such that the transferred operands may be subsequently selected for use in executing an instruction in the pipeline.

11 Claims, 11 Drawing Sheets

EXECUTION UNIT AND METHOD FOR USING ARCHITECTURAL AND WORKING REGISTER FILES TO REDUCE OPERAND BYPASSES

This invention relates generally to techniques for making operands available for processing in the pipelines of execution units of computers. In particular, this invention relates to a technique for reducing the number of operand bypasses in the pipeline of an execution unit by using a working register file and an architectural register file to make operands available for processing in the pipeline.

BACKGROUND OF THE INVENTION

FIG.1 is an illustration of a conventional execution unit 100 of the CPU (central processing unit) of a general purpose computer. The execution unit 100 includes a pipeline 102 to execute certain instructions of a computer program. The pipeline 102 has successive pipeline stages S1 to S9 for executing each instruction in the pipeline 102. The pipeline stages S1 to S9 include an operand selection stage S1, an operand processing (i.e., execute) stage S2, other pipeline stages S3 to S6, a validity determination stage S7, another pipeline stage S8, and an operand write stage S9. Each of the pipeline stages S1 and S3 to S9 occurs in one machine cycle and the operand processing stage S2 occurs in a variable number of machine cycles, as will be described later.

Each instruction in the pipeline 102 is first issued by the CPU to the dispatch controller 104 of the exception unit 100. The dispatch controller 104 dispatches the issued instruction to the pipeline 102 during the operand selection stage S1. The dispatch controller 104 also pre-decodes the instruction and in response generates control signals during the pipeline stages S1 to S9 for the instruction to control the operation of the ARF 106 and the pipeline 102 in the manner described hereafter.

The operand selection stage S1 of the pipeline 102 includes MUXs 128. During the operand selection stage S1 for each instruction in the pipeline 102, the MUXs 128 select one or more source operands S1 SSOP1 and/or S1 SSOP2 for processing by the operand processing stage S2 of the pipeline 102. As described next, this selection is made from among the source operands S1 SOP1 and S1 SOP2 received from the ARF 106, the local destination operands S2 LDOP to S9 LDOP received respectively from the operand bypasses 114 to 121, the external destination operands S2 XDOP to S9 XDOP received respectively from the operand bypasses 121 to 127, and an immediate source operand IMMD SOP received from the control logic 110 of the pipeline 102.

The ARF 106 comprises the architectural registers of the computer. During the operand selection stage Si for each instruction in the pipeline 102, the ARF 106 selectively provides source operands S1 SOP1 and S1 SOP2 from selected architectural registers of the ARF 106 to the operand selection stage S1 of the pipeline 102. The source operand S1 SOP1 or S1 SOP2 provided by the ARF 106 will be selected by one of the MUXs 128 if the dispatch controller 104 determines that the source operand S1 SOP1 or S1 SOP2 is currently available in one of the architectural registers of the ARF 106. This architectural register is specified by the instruction as a source.

However, for each instruction in the pipeline 102, the dispatch controller 104 may determine that the instruction requires an immediate source operand IMMD SOP from the control logic 110 instead of a source operand S1 SOP1 or S1 SOP2. In this case, one of the MUXs 128 selects the immediate source operand IMMD SOP.

The dispatch controller 104 may also determine during the operand selection stage S1 for each instruction in the pipeline 102 that the source operand S1 SOP1 or S1 SOP2 is not yet available in an architectural register of the ARF 106 but is in flight and available elsewhere. In this case, it may be available as one of the local destination (or result) operands S2 LDOP to S8 LDOP or one of the external destination operands S2 XDOP to S8 XDOP and then selected by one of the MUXs 128. The local destination operands S2 LDOP to S8 LDOP are generated by the pipeline 102 respectively during the pipeline stages S2 to S8 for other instructions in the pipeline 102. The external destination operands S2 XDOP to S8 XDOP are respectively generated during the pipeline stages S2 to S8 for instructions in another pipeline (designated by X, but not shown) of the execution unit 100. This is done by respective external operand bypass sources of this pipeline.

In the operand processing stage S2 for each instruction in the pipeline 102, the one or more selected source operands S1 SSOP1 and/or S1 SSOP2 are first latched by the registers 134 of the operand processing stage S2 as the one or more selected source operands S2 SSOP1 and/or S2 SSOP2. Furthermore, in the operand processing stage S2 for the instruction, the control logic 110 of the pipeline 102 generates control signals that cause the arithmetic logic 132 of the operand processing stage S2 to process the one or more selected source operands S2 SSOP1 and/or S2 SSOP2 and generate in response a destination operand S2 LDOP for the instruction. These control signals are generated in response to decoding the instruction.

The pipeline stages S3 to S8 respectively include registers 138 to 143. Thus, in the pipeline stage S3 for each instruction in the pipeline 102, the register 138 latches the local destination operand S2 LDOP generated in the operand processing stage S2 for the instruction as the local destination operand S3 LDOP. Similarly, in the pipeline stages S4 to S8 for each instruction in the pipeline, the registers 139 to 143 respectively latch the local destination operands S3 LDOP to S7 LDOP that were respectively latched in the previous pipeline stages S3 to S7 as respectively the destination operands S4 LDOP to S8 LDOP. Thus, the destination operands S3 LDOP to S8 LDOP are all delayed versions of the destination operand S2 LDOP.

The pipeline stages S3 to S6 and S8 are needed since other processing is occurring in the execution unit 226. Moreover, the dispatch controller 104 makes the determination of whether an instruction is valid or invalid in the validity determination stage S7.

For each instruction in the pipeline 102 that is determined to be valid by the dispatch controller 104, the architectural register in the ARF 106 that is specified by the instruction as the destination stores the destination operand S8 LDOP during the operand write stage S9 for the instruction. Thus, the destination operand S8 LDOP for this particular instruction will now be available in the ARF 106 as a source operand S1 SOP1 or S1 SOP2 in the operand selection stage S1 for a later instruction in the pipeline 102 or another pipeline of the execution unit 100.

However, an instruction in the pipeline 102 may be invalid due to a branch mispredict, a trap, or an instruction recirculate. A branch mispredict will be indicated by a BMP (branch mispredict) signal received by the dispatch controller 104 from another pipeline of the execution unit 100. A trap may be detected locally by the dispatch controller 104 or from TRP (trap) signals received by the dispatch controller 104 from other pipelines in the execution unit. Moreover, an instruction recirculate will be indicated by RCL (instruction recirculate) signals received by the dispatch controller 104 from the data cache (not shown) of the CPU when a data cache miss has occurred.

If the dispatch controller 104 determines that an instruction in the pipeline 102 is invalid, then the ARF 106 does not store the destination operand S8 LDOP for the instruction. In this way, the ARF 106 cannot be corrupted since the destination operand S8 LDOP for the instruction will not be stored in the ARF 106 until the dispatch controller 104 has determined that the instruction is valid.

However, later instructions in the pipeline 102 may depend on the local destination operands S2 LDOP to S8 LDOP of earlier instructions in the pipeline 102 and/or external destination operands S2 XDOP to S8 XDOP of earlier instructions in another pipeline which are in flight and have not yet been stored in the ARF 106. Similarly, later instructions in the other pipeline may depend on the local destination operands S2 LDOP to S8 LDOP of earlier instructions in the pipeline 102 which are in flight and have not yet been stored in the ARF 106. Thus, these local and external destination operands S2 LDOP to S8 LDOP to S2 XDOP to S8 XDOP must be made available with minimum latency to preserve the performance of the CPU. In order to do this, the execution unit 100 includes the operand bypasses 114 to 120 from the pipeline 102 and the operand bypasses 121 to 127 from the other pipeline in the execution unit 100.

More specifically, the arithmetic logic 132 is coupled to the MUXs 128 by the operand bypass 114 for the operand processing stage S2. Similarly, the registers 138 to 143 are respectively coupled by the operand bypasses 115 to 121 for the intermediate stages S3 to S8 to the MUXs 128. In this way, the arithmetic logic 132 and the registers 138 to 143 are local operand bypass sources of respectively the local destination operands S2 LDOP to S8 LDOP. And, as alluded to earlier, the external operand bypass sources in the other pipeline of the execution unit 100 are coupled to the MUXs 128 by the operand bypasses 121 to 127 for the pipeline stages S2 to S8 to provide the external destination operands S2 LDOP to S8 LDOP.

Thus, in the operand selection stage S1 for each instruction in the pipeline 102, this particular instruction may specify as a source the same selected register in the ARF 106 that an earlier instruction in the pipeline 102 or another pipeline in the execution unit 100 specifies as a destination. This earlier instruction may be in the pipeline stage S2, . . . , S7, or S8 of the pipeline 102 or the other pipeline. In this case, the local or external destination operand S8 LDOP or S8 XDOP generated for the earlier instruction will not yet be available from the selected register but will be available as the local or external destination operand S2 LDOP, . . . , S6 XDOP, or S7 XDOP on the corresponding operand bypass 114, . . . , 126, or 127. As a result, the MUXs 128 will select this local or external destination operand S2 LDOP, . . . , S6 XDOP, or S7 XDOP for processing by the arithmetic logic 132.

FIG. 2 illustrates this more precisely for the pipeline 102. As shown, the initial instruction ADD in the pipeline 102 obtains its source operands S1 SOP1 and S1 SOP2 from the registers r0 and r1 of the ARF 106 that are specified as sources during the operand selection stage S1 for the ADD instruction. And, during the operand processing stage S2 for the instruction ADD, the destination operand S2 LDOP is generated. However, the destination operand S8 LDOP is written to the register r2 of the ARF 106 that is specified as the destination only during the operand write stage S9 for the instruction ADD. Thus, any instruction SUB, . . . , or AND that has its operand selection stage S1 during the pipeline stage S2, . . . , S7, or S8 of the instruction ADD and is dependent on the instruction ADD by specifying the register r2 as a source, must use the corresponding operand bypass 114, . . . , 119, or 120 to obtain the destination operand S2 LDOP, . . . , S2 LDOP, or S8 LDOP as the selected source operand S1 SOP1 or S1 SOP2. And, only for the instructions XNOR, etc. . . . , that have their operand selection stages S1 after the pipeline stage S2 to S8 of the instruction ADD, will the selected source operand S1 SOP1 or S1 SOP2 be directly available from the register r2.

Therefore, since the ARF 106 is only written to in the operand write stage S9 for each instruction, the pipeline 102 must have operand bypasses 114 to 120 for the pipeline stages S2 to S8 in the pipeline 102 and must also be coupled to the operand bypasses 121 to 127 from the other pipeline. Unfortunately, these numerous operand bypasses 114 to 127 occupy much space and introduce complex and intractable timing and routing problems in the CPU.

In view of the foregoing, it would be desirable to reduce the number of operand bypass to and from pipelines in an execution unit to reduce the complexity of the pipelines. Furthermore, it would be desirable to do so without increasing the latency in which local and external destination operands of earlier instructions are made available for selection as source operands for later instructions.

Referring back to FIG. 1, in many CPUs, the arithmetic logic 132 is configured to process (i.e., perform arithmetic computations on) the one or more selected source operands S1 SSOP1 and/or S1 SSOP2 for all instructions of a predefined arithmetic instruction type. These may include performance critical arithmetic instructions which are critical to the performance of the CPU since they are commonly used. For each of the performance critical arithmetic instructions, the operand processing stage S2 occurs in one machine cycle. The instructions of the predefined arithmetic instruction type may also include non-performance critical arithmetic instructions which are not as frequently used and therefore not as critical to the performance of the CPU. For each of these non-performance critical arithmetic instructions, the operand processing stage S2 has substages and occurs in multiple machine cycles with the number of machine cycles varying depending on the instruction.

The temptation to configure the arithmetic logic 132 to perform processing operations for both performance critical and non-performance critical arithmetic instructions of a certain arithmetic instruction type stems from the fact that many of the performance critical arithmetic instructions are similar to the non-performance critical arithmetic instructions. Although configuring the arithmetic logic 132 to perform processing operations for both performance critical and non-performance critical arithmetic instructions results in potential savings in area and power consumption, the complicated design of the CPU can slow down its performance with respect to the performance critical instructions.

Thus, it would be desirable to have a CPU with a performance critical pipeline that processes only the performance critical arithmetic instructions and a separate non-performance critical pipeline that processes only the non-performance critical arithmetic instructions. Moreover, it would be further desirable to locate at least the arithmetic logic of the non-performance critical pipeline away from the core of the execution unit. This enables the dispatch controller, the performance critical pipeline, and the ARF of the core of the execution unit to operate over shorter distances with less complexity so that the performance of the performance critical pipeline is maximized.

SUMMARY OF THE INVENTION

In summary, the present invention is a CPU (central processing unit) of a computer. The CPU comprises a dispatch controller, a pipeline, a working register file, and an architectural register file. The dispatch controller dispatches instructions for execution and determines whether the dispatched instructions are valid or invalid. The pipeline executes the dispatched instructions using selected operands in the pipeline and generates operands in response. The working register file stores the generated operands before the executed instructions are determined to be valid or invalid by the dispatch controller such that the stored operands may be subsequently selected for use in executing an instruction in the pipeline. The architectural register file stores the generated operands for those of the executed instructions that are determined to be valid by the dispatch controller and transfer operands currently stored therein when one of the executed instructions is determined to be invalid by the dispatch logic. The working register file then stores the transferred operands such that the transferred operands may be subsequently selected for use in executing an instruction in the pipeline.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 3:
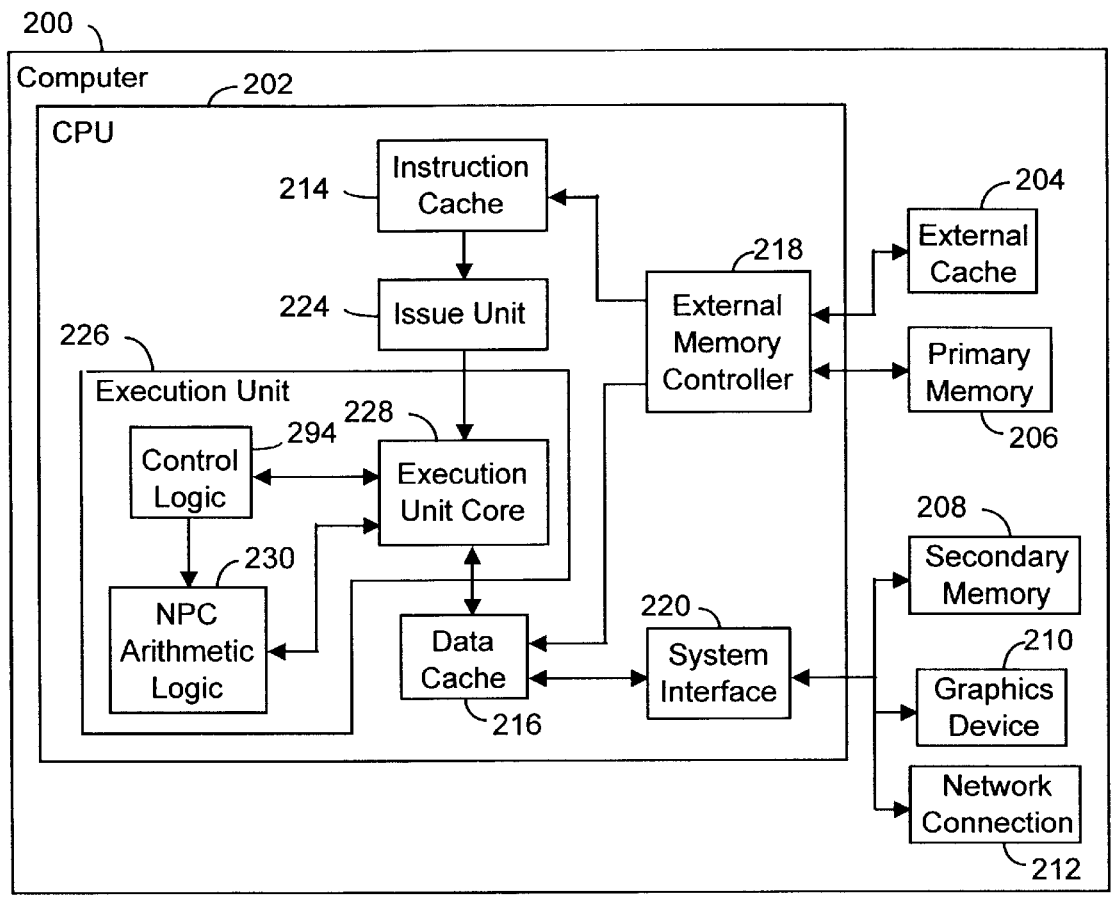
FIG. 3 is a block diagram of a computer in accordance with the present invention.

Turning to FIG. 3, there is shown a computer 200 constructed in accordance with the present invention. The computer 200 includes a CPU 202, an external cache 204, a primary memory 206, a secondary memory 208, a network connection 210, and a graphics device 212.

The CPU 202 includes an instruction cache 214, a data cache 216, an external memory controller 218 and a system interface 220. The external memory controller 218 is connected to the instruction cache 214, the data cache 216, the external cache 204, and the primary memory 206. And, the system interface 220 is connected to the data cache 216, the secondary memory 208, the graphics device 210, and the network connection 212.

The CPU 202 also includes an issue unit 224. The issue unit 224 fetches instructions of a computer program from the instruction cache 214. It then issues the fetched instructions for execution in the various pipelines in the execution unit 226.

The CPU 202 further includes an execution unit 226. The execution unit 226 includes an execution unit core 228 and NPC (non-performance critical) arithmetic logic 230. As will be described in greater detail later, the NPC arithmetic logic 230 and its control logic 294 are not co-located with (i.e., remotely located from) the execution unit core 228.

Figure 4:
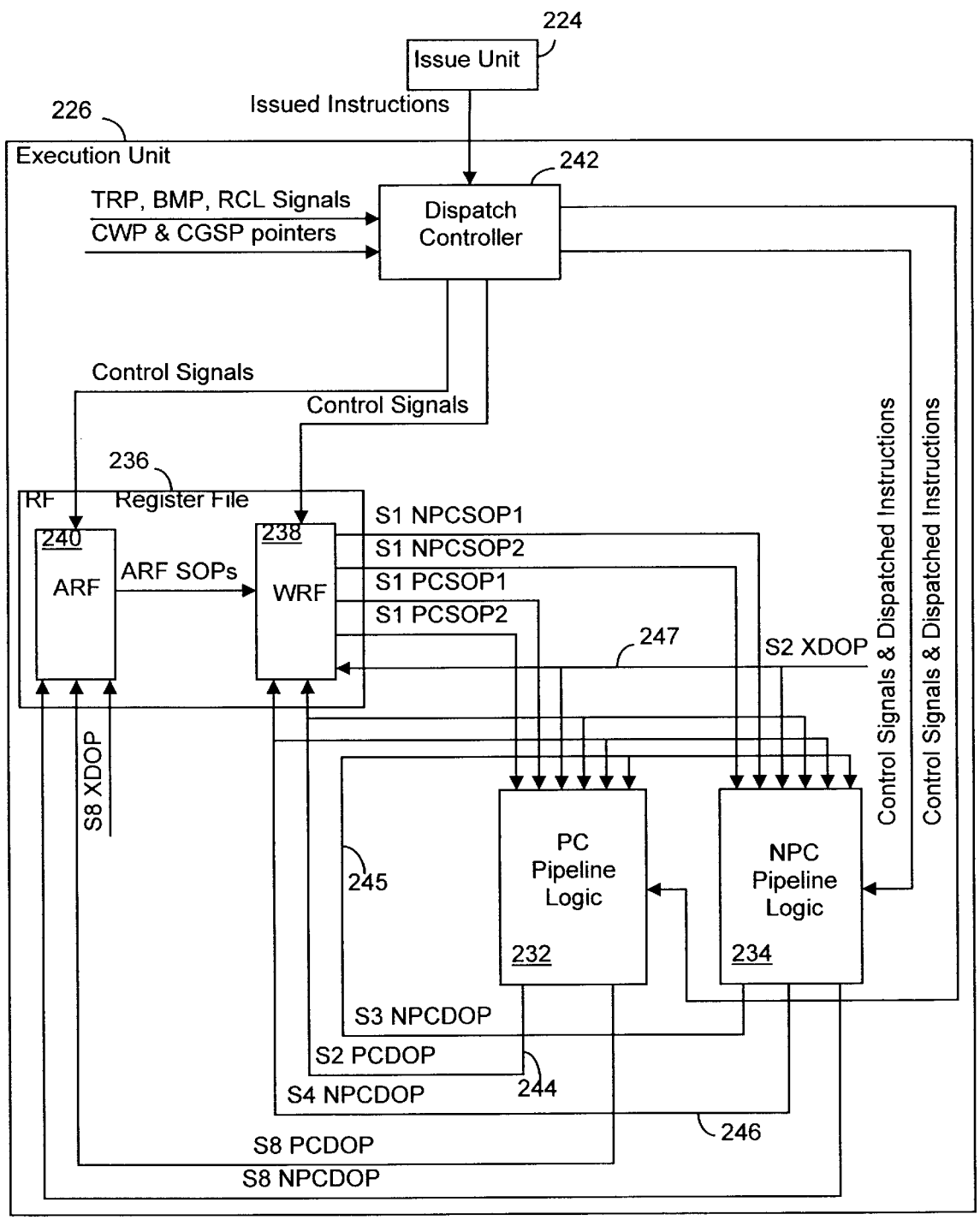
FIG. 4 is a block diagram of the novel execution unit of the computer of FIG. 3.

Turning to FIG. 4, the execution unit 226 is unlike the conventional execution unit 100 described earlier for several reasons. First, it includes a PC (performance critical) pipeline 232 and an NPC (non-performance critical) pipeline 234 to increase the performance of the CPU 202. Second, it includes a register file 236 that includes both a WRF (working register file) 238 and an ARF 240 to provide a reduced number of operand bypasses 244 to 247 to and from the PC and NPC pipelines 232 and 234 and any other pipeline in the execution unit 226. The operation of the WRF 238 and the ARF 240 will be described first primarily with respect to the PC pipeline 232. Then, the operation of the PC and NPC pipelines 232 and 234 with respect to each other will be discussed.

Operation of WRF and ARF

Like the conventional execution unit 100 described earlier, the execution unit 226 includes a dispatch controller 242. The dispatch controller 242 receives the issued instructions from the issue unit 214 and determines which of the issued instructions is to be dispatched to the PC pipeline 232 for execution. It then pre-decodes each issued instruction that is to be dispatched to the PC pipeline 232 to resolve operand dependencies with other instructions in the PC pipeline 232, the NPC pipeline 234, or in another pipeline (not shown) in the execution unit 226. In response, the dispatch controller 104 generates control signals during the pipeline stages S1 to S9 to control the operation of the WRF 238, the ARF 240, and the PC pipeline 232 in the manner described hereafter.

The WRF 238 comprises the working registers of the execution unit 226 while the ARF 240 comprises the architectural registers of the execution unit 226. Each of the working registers corresponds to one of the architectural registers.

Figure 1:
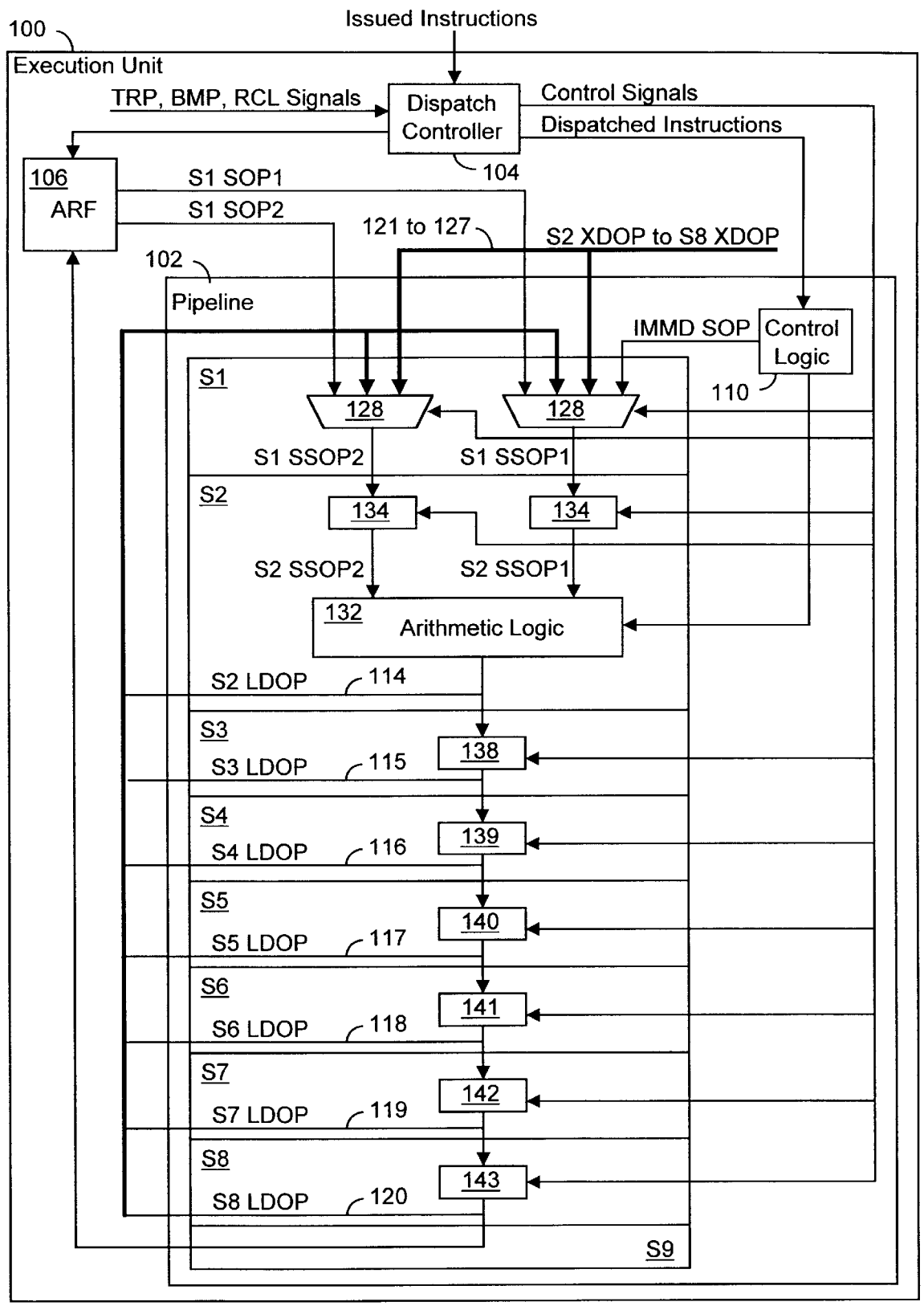
FIG. 1 is a block diagram of the instruction pipeline of a prior art execution unit.
Figure 5:
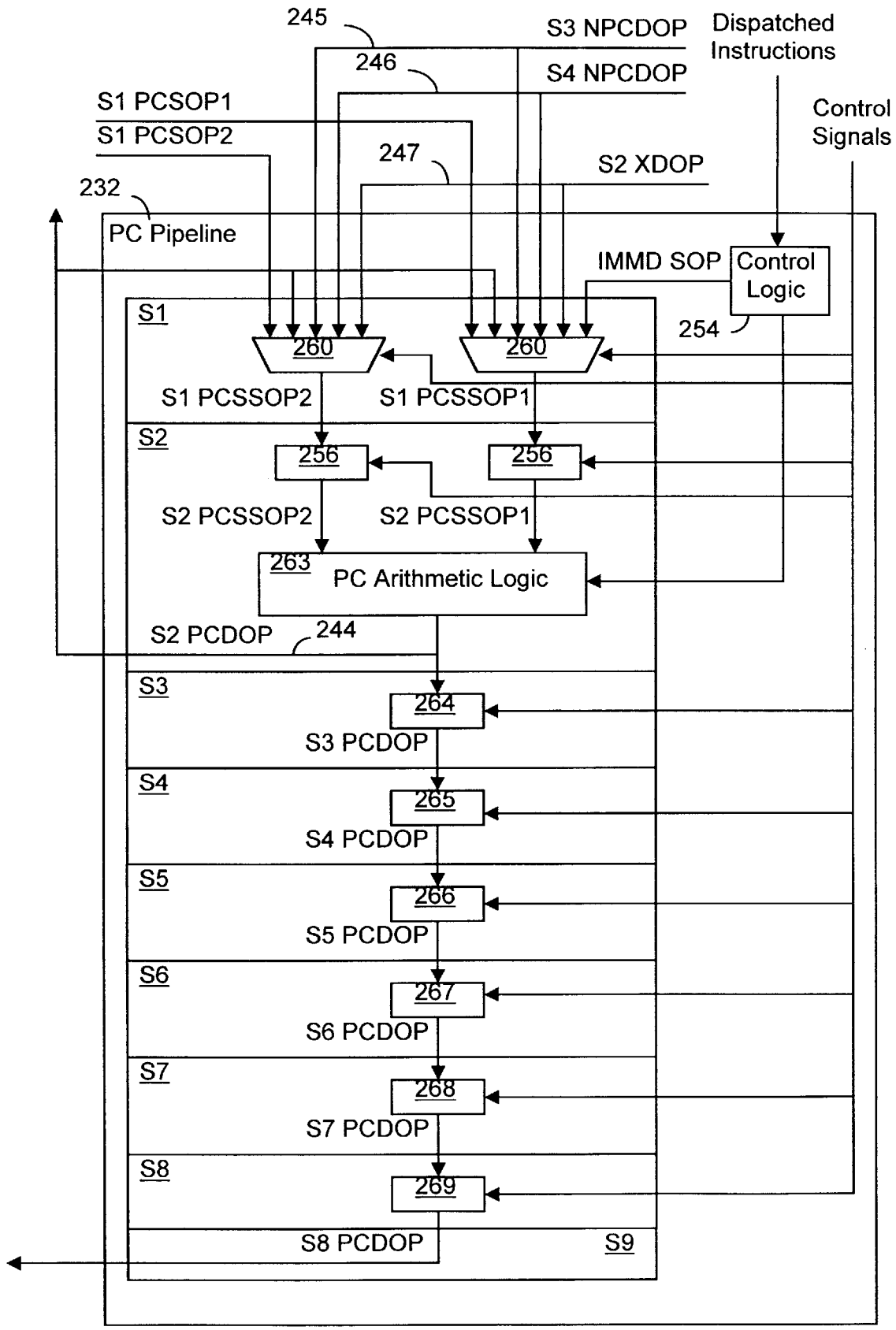
FIG. 5 is a block diagram of a performance critical pipeline of the execution unit of FIG. 4.

Referring to FIG. 5, like the pipeline 102 of FIG. 1, the PC pipeline 232 has successive pipeline stages S1 to S9. However, these pipeline stages S1 to S9 include an operand selection stage S1, an operand processing (i.e., execute) stage S2, a WRF operand write stage S3, other pipeline stages S4 to S6, a validity determination stage S7, another pipeline stage S8, and an ARF operand write stage S9. Similar to the pipeline of FIG. 1, the pipeline stages S4 to S6 and S8 are required for other processing that is performed by the execution unit 226. Each of the pipeline stages S1 to S9 of the PC pipeline 232 occurs in one machine cycle.

Similar to the pipeline 102 of FIG. 1, the operand processing stage S2 includes registers 256. Thus, during the operand selection stage S1 for each instruction in the PC pipeline 232, one or more selected source operands S1 PCSSOP1 and/or S1 PCSSOP2 are latched by one or more of the registers 256 as the one or more selected source operands S2 PCSSOP1 and/or S2 PCSSOP2. Furthermore, the destination operand S2 PCDOP for each instruction in the PC pipeline 232 is generated by the PC arithmetic logic 263 in the operand processing stage S2 for the instruction. As in the pipeline 102, this is done by processing the one or more selected source operands S2 PCSSOP1 and/or S2 PCSSOP2 in response to control signals generated by the control logic 254 of the PC pipeline 232. The control logic 254 decodes each instruction in the PC pipeline 232 to generate the control signals used to control the PC arithmetic logic 263.

Referring back to FIG. 4, the destination operand S2 PCDOP for each instruction in the PC pipeline 232 is written to the WRF 238 in the WRF write stage S3 for the instruction, unlike the pipeline 102 of FIG. 1. In doing so, the destination operand S2 PCDOP is stored in one of the working registers of the WRF 238. This working register corresponds to the architectural register of the ARF 240 that is specified by the instruction as the destination. Similarly, the destination operand S4 NPCDOP from the NPC pipeline 234 is written to the WRF 238 in the WRF write stage S5 for each instruction in the NPC pipeline 234. And, the destination operand S2 XDOP from another pipeline of the execution unit 226 is written to the WRF 238 in the WRF write stage S3 for each instruction in this other pipeline. As a result, the destination operands S2 PCDOP, S4 NPCDOP, and S2 XDOP just described are now available directly from the WRF 238 as the source operands S1 PCSOP1 and S1 PCSOP2 in the PC pipeline 232, the source operands S1 NPCSOP1 and S1 NPCSOP2 in the NPC pipeline 234, or the source operands in another pipeline in the execution unit 226.

The benefit of doing this before an instruction is determined to be valid or invalid by the dispatch controller 242 in the validity determination stage S7 is that only a reduced number of operand bypasses 244 to 247 are needed in the execution unit 226. This will be more apparent from the following discussion of how the one or more selected source operands S1 PCSSOP1 and/or S1 PCSSOP2 for each instruction in the PC pipeline 232 are selected for processing.

Referring again to FIG. 5, the operand selection stage S1 includes MUXs 260 that operate similar to the MUXs 128 of the operand selection stage S1 of the pipeline 102 of FIG. 1. Thus, during the operand selection stage S1 for each instruction in the PC pipeline 232, the MUXs 260 select one or more source operands S1 PCSSOP1 and/or S1 PCSSOP2 for processing by the operand processing stage S2. This selection is made only from among the source operands S1 SOP1 and S1 SOP2 received from the WRF 238, the destination operands S2 PCDOP, S3 NPCDOP, S4 NPCDOP, and S2 XDOP received from the operand bypasses 244 to 247, and an immediate source operand IMMD SOP received from the control logic 254 of the PC pipeline 232. Thus, the MUXs 260 are much less complex than the MUXs 128 of the selection logic 112 since they are connected to a reduced number of operand bypasses 244 to 247.

Similar to the ARF 106 described earlier, the WRF 238 selectively provides source operands S1 PCSOP1 and S1 PCSOP2 from selected working registers in the WRF 238 to the PC pipeline 232. This is done during the operand selection stage S1 for each instruction in the PC pipeline 232. Specifically, the WRF 238 may provide a new source operand S1 PCSOP1 or S1 PCSOP2 to the PC pipeline 232 during the operand selection stage S1. This occurs if the dispatch controller 242 determines during the operand selection stage S1 that the instruction specifies an architectural register in the ARF 240 for which the source operand S1 PCSOP1 or S1 PCSOP2 is available in the corresponding working register of the WRF 238.

But, for each instruction in the PC pipeline 232, dispatch controller 242 may have determined that the instruction requires an immediate source operand IMMD SOP from the control logic 254 instead of the source operand S1 PCSOP1 or S1 PCSOP2. In this case, one of the MUXs 260 selects the immediate source operand IMMD SOP.

The dispatch controller 242 may also determine for each instruction in the PC pipeline 232 that the source operand S1 PCSOP1 or S1 PCSOP2 is not yet available in a working register of the WR 238 but is in flight and available elsewhere. In the case, it may be available as one of the destination operands S2 PCDOP, S3 NPCDOP, S4 NPCDOP, and S2 XDOP and then selected by one of the MUXs 260. The destination operand S2 PCDOP is generated by the PC pipeline 232 during the pipeline stage S2 for an earlier instruction in the PC pipeline 232. The destination operands S3 NPCDOP and S4 NPCDOP are generated by the NPC pipeline 234 respectively during the pipeline stages S3 and S4 for earlier instructions in the NPC pipeline 234. Furthermore, the destination operand S2 XDOP is generated by an external operand bypass source in another pipeline (designated by X, but not shown) of the execution unit 226 during the pipeline stage S2 for an earlier instruction in that pipeline.

It is important to note here that the number of operand bypasses 244 to 247 required by the PC pipeline 232 is drastically reduced in comparison to that required by the pipeline 102 of FIG. 1. This is the result of writing the destination operands S2 PCDOP, S2 XDOP, and S4 NPCDOP to the WRF 238 in the early pipeline stages S3, S3, and S5 for the instructions which respectively generated the destination operands S2 PCDOP, S2 XDOP, and S4 NPCDOP.

Similar to the pipeline 102 of FIG. 1, the pipeline stages S3 to S8 of the PC pipeline 232 respectively include registers 264 to 269. During the pipeline stages S3 to S8 for each instruction in the PC pipeline 232, the registers 264 to 269 respectively latch the destination operands S2 PCDOP to S7 PCDOP that were respectively generated or latched in the previous pipeline stages S2 to S7 as respectively the destination operands S3 PCDOP to S8 PCDOP.

Furthermore, in the validity determination stage S7 for each instruction in the PC pipeline 232, the dispatch controller 242 determines whether the instruction is valid or invalid. As with the pipeline 102 of FIG. 1, the TRP, BMP, and RCL signals will indicate to the dispatch controller 242 whether the instruction is valid or invalid.

Then, in the ARF operand write stage S9 for each instruction in the pipeline 232 that is determined to be valid by the dispatch controller 242, the architectural register in the ARF 240 that is specified by the instruction as the destination stores the destination operand S8 PCDOP provided by the register 269. In this way, the ARF 240 is used to store only the destination operands S8 PCDOP of instructions in the PC pipeline 232 that are valid. Similarly, the ARF 240 is used to store the destination operands S8 NPCDOP and S8 XDOP of valid instructions in the NPC pipeline 234 and any other pipeline in the execution unit 226. In other words, the ARF 240 stores all of the currently valid operands ARF OPs in the execution unit 226.

This is done so that, when the dispatch controller 242 determines that an instruction in the PC pipeline 232 is invalid, the valid operands ARF OPs stored by the architectural registers of the ARF 240 that correspond to the working registers of the WRF 238 are transferred to the WRF 238. The working registers of the WRF 238 then store the transferred operands ARF OPs to replace the operands currently stored therein. This operation places the WRF 238 in the same state that it was at the time just before the instruction was beginning to be executed. As a result, the transferred operands ARF OPs may be subsequently selected as the source operands S1 PCSOP1 and S1 PCSOP2 in the PC pipeline 232, the source operands S1 NPCSOP1 and S1 NPCSOP2 in the NPC pipeline 234, or the source operands in another pipeline in the execution unit 226.

Figure 2:
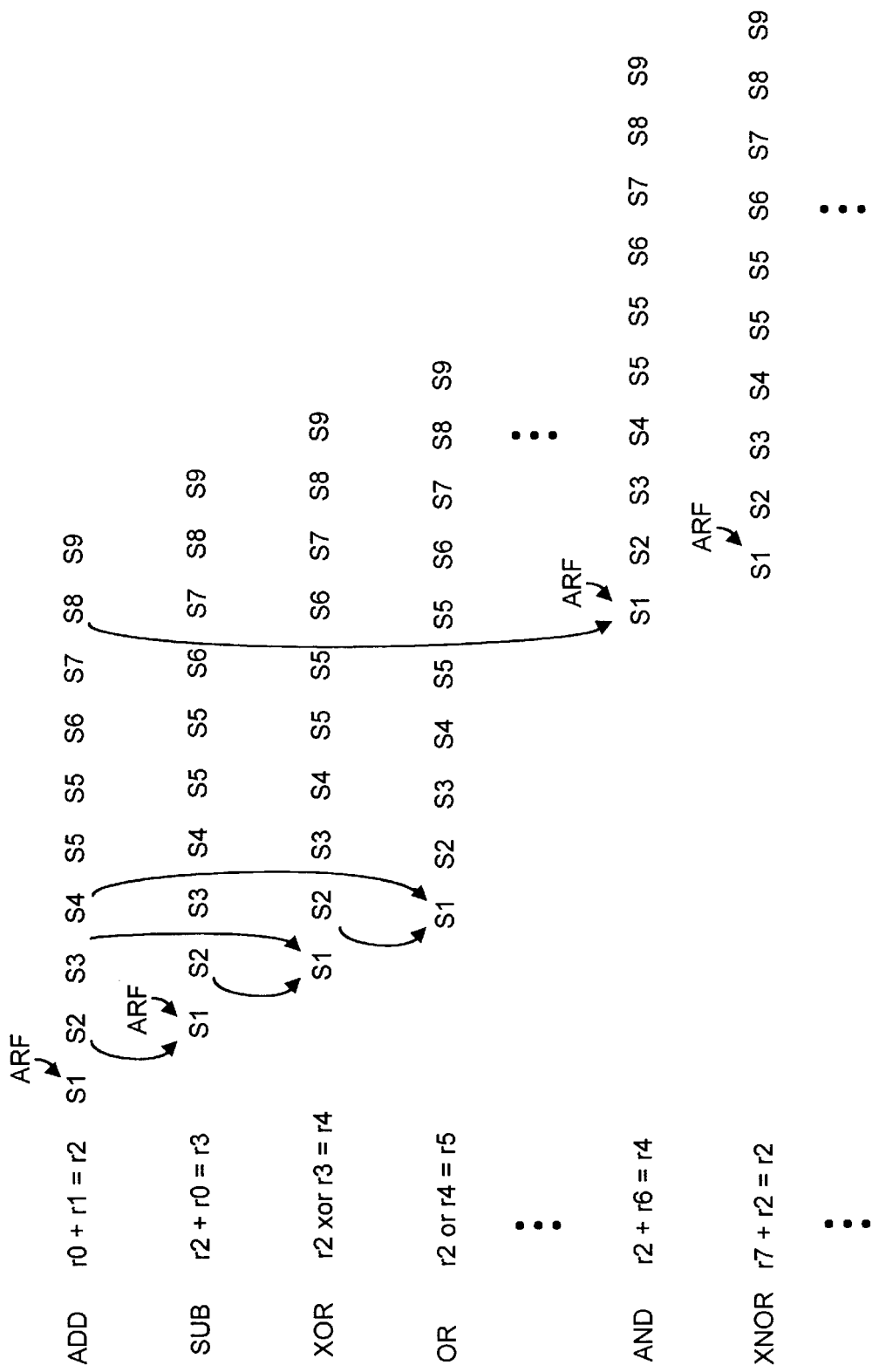
FIG. 2 is a diagram of how the operand bypasses of the execution unit of FIG. 1 are used with just an architectural register file.
Figure 6:
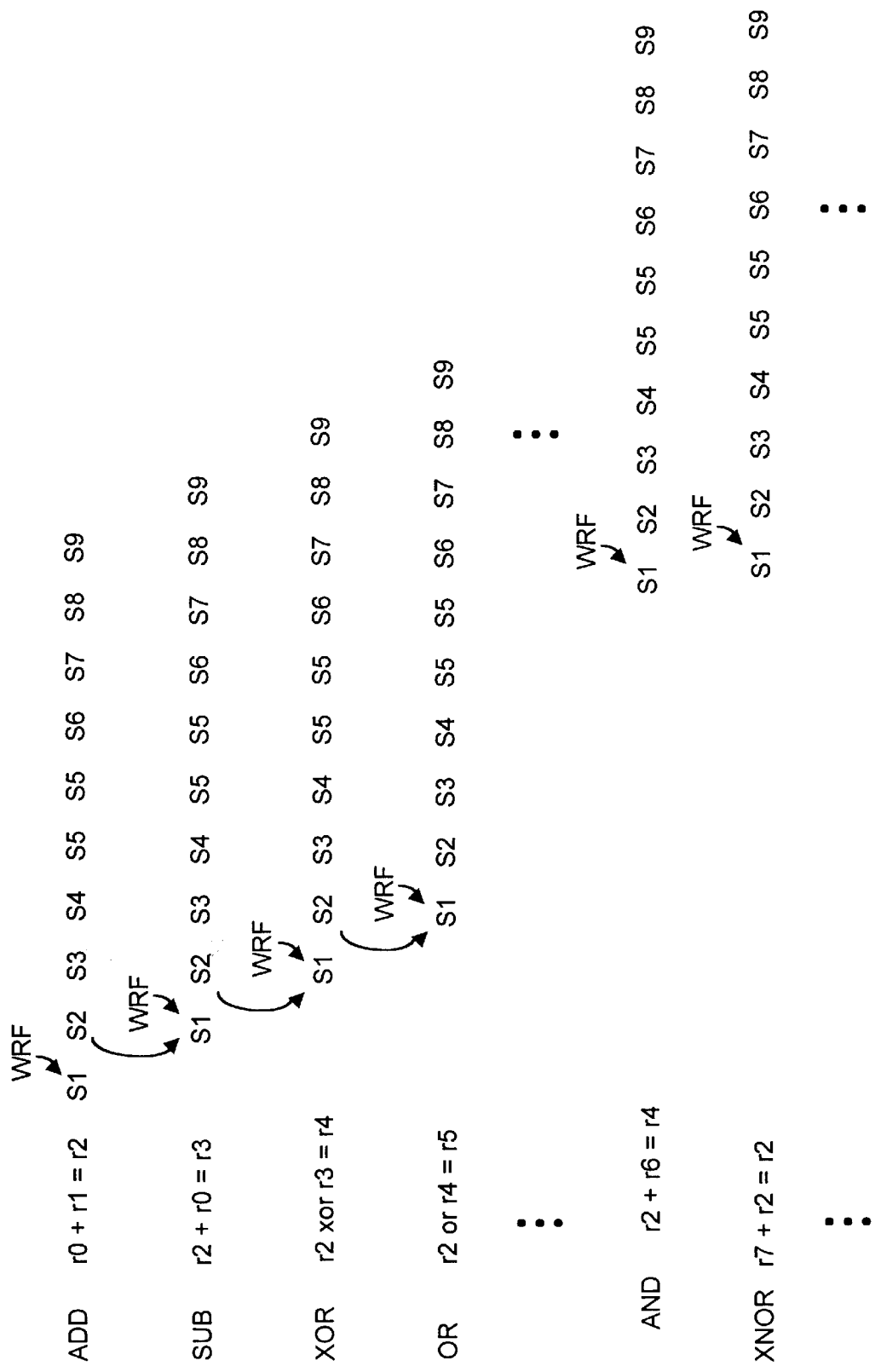
FIG. 6 illustrates how the reduced number of operand bypasses are used in the pipeline of FIG. 5 with a working register file and an architectural register file.

The use of the WRF 238 and the ARF 240 in the PC pipeline 232 to provide a reduced number of operand bypasses 244 to 247 is further illustrated in the example of FIG. 6. As in the example for the pipeline 102 given in FIG. 2, each of the instructions SUB, XOR, OR, . . . , AND, XNOR, . . . , etc., is dependent on the instruction ADD since it specifies the architectural register r2 of the ARF 240 as the source of a source operand S1 PCSOP1 or S1 PCSOP2. However, only the instruction SUB, which has its operand selection stage S1 during the operand processing stage S2 of the instruction ADD, requires an operand bypass 244 to provide the destination operand S2 PCDOP as the source operand S1 PCSOP1 or S1 PCSOP2. Thus, for any instruction XOR, OR, . . . , AND that has its operand selection stage S1 during the pipeline stage S3, . . . , S7, or S8 of the instruction ADD and is dependent thereon by specifying the register r2 as a source, the source operand S1 PCSOP1 or S1 PCSOP2 is directly obtained from the working register of the WRF 238 that corresponds to the architectural register r2 instead of from an operand bypass. This is in direct contrast to the example of FIG. 2.

Figure 7:
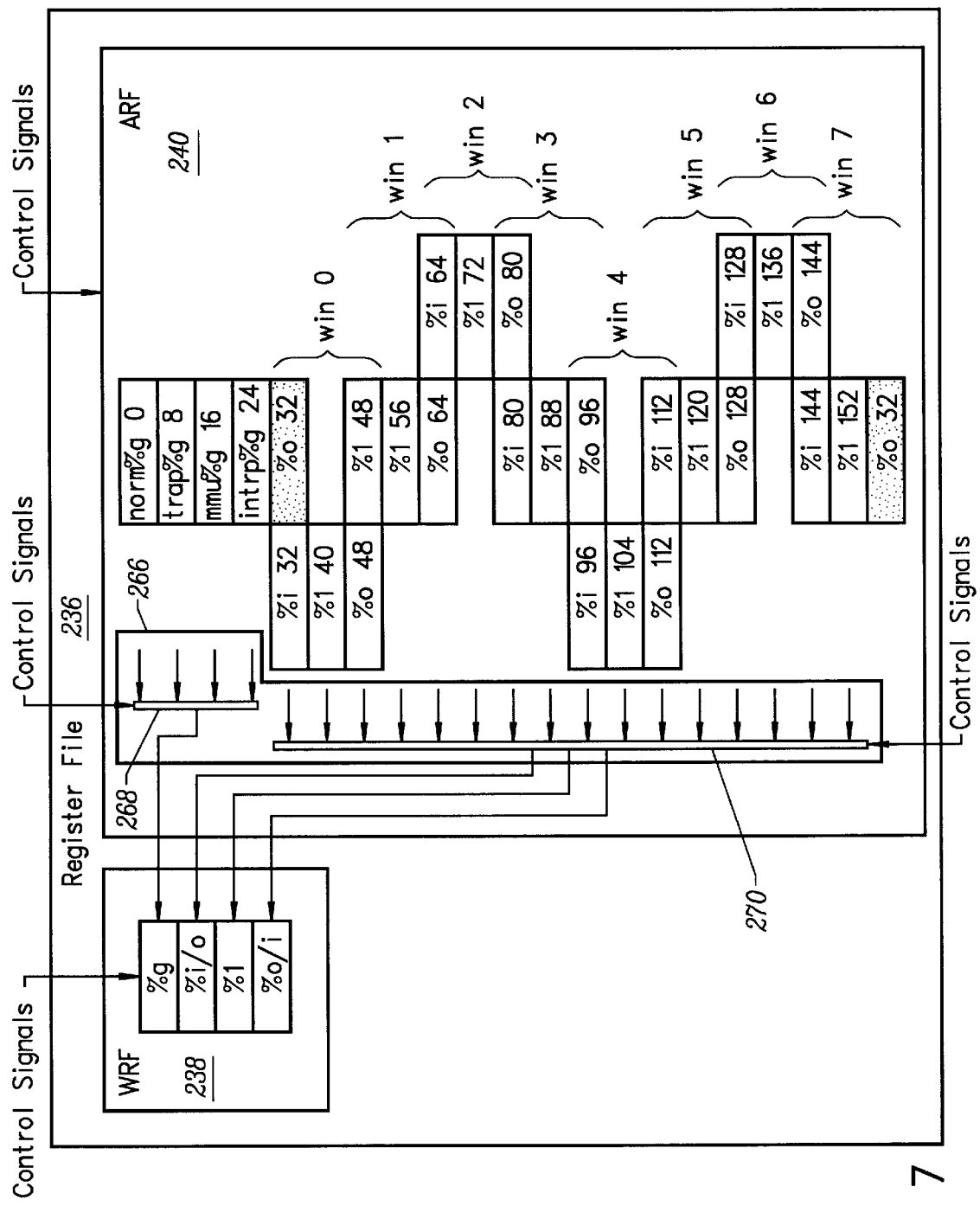
FIG. 7 is a block diagram of the register windows of the architectural register file and the working register file.

Moreover, as shown in FIG. 7, the architectural registers of the ARF 240 may be subdivided into register windows win0 to win7 in accordance with "The SPARC Architectural Manual", version 9, referenced earlier. In this case, the architectural registers include eight sets of in registers %i, eight sets of out registers %o, and eight sets of local registers %i. Each of the register windows win0 to win7 includes a corresponding set of in registers %i, a corresponding set of out registers %o, and a corresponding set of local registers %l. The sets of in registers %i of the register windows win0 to win7 are the sets of out registers %o of the register windows win7 to win6 (in circular order). Furthermore, the architectural registers also include four sets of global registers %g. For purposes of this document, each of the register windows win0 to win7 also includes a corresponding set of global registers %g.

Only one of the register windows win0 to win7 may be currently used by the execution unit 226 at a time. This current register window win0, . . . , or win7 is specified by the CWP (current window pointer) pointer stored by the CWP register (not shown) of the execution unit and provided to the dispatch controller 242. Furthermore, the current register window win0, . . . , or win7 is further specified by the CGSP (current global set pointer) which is stored by a CGSP register (not shown) and which points to the current set of global registers %g that is being used with the current register window win0, . . . , or win7.

Thus, in this embodiment, the WRF 238 has a single register window of working registers. This register window includes sets of in, local, out, and global registers %i, %l, %o, and %g that respectively correspond to the sets of in, local, out, and global registers %i, %l, %o, and %g in the current register window win0, . . . , or win7 of the ARF 240.

Furthermore, the ARF 240 includes selection logic 266. The selection logic 266 comprises a MUX 268 for selecting the sets of in, local, and out registers %i, %l, and %o of the register window of the WRF 238 from among the sets of in, local, and out registers %i, %l, and %o of the register windows win0, . . . , or win7 of the ARF 240. Additionally, the selection logic 266 comprises a MUX 270 for selecting the set of global registers %g of the register window of the WRF 238 from among the sets of global registers %g of the ARF 240.

Anytime that the CWP pointer and/or the CGSP pointer changes, the register window of the WRF 238 must change accordingly. Thus, in the case where the CGSP pointer changes, the MUX 270 of the ARF 240 transfers the set of global registers %g specified by the CGSP. And, the WRF 238 stores this transferred set of global registers %g in place of the previous set of global registers %g stored therein. Similarly, if the CWP pointer changes, then the MUX 268 of the ARF 240 transfers the sets of in, local, and out registers %i, %l, and %o for the register window win0, . . . , or win7 specified by the CWP. In the case, the WRF 238 stores this transferred set of in, local, and out registers %i, %l, and %o and replaces the previous set of in, local, and out registers %i, %l, and %o stored therein. In this way, the in, local, out, and global registers %i, %l, %o, and %g of the register window of the WRF 238 always correspond to the in, local, out, and global registers %i, %l, %o, and %g of the current register window win0, . . . , or win7 of the ARF: 240.

Furthermore, when the dispatch controller 242 determines that an instruction in the PC pipeline 232 is invalid, the MUXs 268 and 270 select the sets of in, local, out, and global registers %i, %l, %o, and %g of the current register window win0, . . . , or win7 of the ARF 240. At the same time, the WRF 238 stores the selected sets of in, local, out, and global registers %i, %l, %o, and %g as the register window of the WRF 238. As a result, the entire current register window win0, . . . , or win7 of the ARF 240 is transferred to the WRF 238 so that the valid operands ARF OPs stored by the current register window win0, . . . , or win7 are available for selection as the source operands S1 PCSOP1 and S1 PCSOP2 in the PC pipeline 232, the source operands S1 NPCSOP1 and S1 NPCSOP2 in the NPC pipeline 234, or the source operands in another pipeline in the execution unit 226.

Alternatively, the architectural registers of the ARF 240 may not be subdivided into register windows. In other words, the WRF 238 and the ARF 240 may have an equal number of registers so that there is only one corresponding architectural register of the ARF 240 for each working register of the WRF 238. In this case, the ARF 240 does not include the selection logic 266 and the operation of the WRF 238 and the ARF 240 is simply as described earlier.

As those skilled in the art will recognize, the WRF 238 and the ARF 240 may be used with any kind of pipeline. For example, the WRF 238 and the ARF 240 may be used in a pipeline that accesses memory, in a pipeline that executes integer instructions, in a pipeline that executes special instructions, or in a pipeline that executes floating point instructions.

Furthermore, those skilled in the art will further recognize that the operation of the WRF 238 and ARF 240 would be similar if the PC pipeline 232 had more than one operand processing stage. For example, if the PC pipeline 232 had operand processing stages S2 to S4, the WRF 238 would be written with the destination operand S4 PCDOP in the WRF write stage S5. This is similar to the NPC pipeline 234 which uses the WRF 238 and the ARF 240 in a similar way as does the PC pipeline 232, as will be clear from the following discussion.

Operation of Performance Critical and Non-Performance Critical Pipelines

Referring again to FIG. 4, the execution unit 226 includes both a PC pipeline 232 and an NPC pipeline 234, as mentioned previously. The PC and NPC pipelines 232 and 234 are used for executing certain arithmetic instructions of a predefined arithmetic instruction type which can be selectively classified as PC arithmetic instructions and NPC arithmetic instructions. Thus, the issue unit 224 selectively issues such instructions as PC arithmetic instructions for execution by the PC pipeline 232 and NPC arithmetic instructions for execution by the NPC pipeline 234. In doing so, the issue unit 224 provides the PC and NPC arithmetic instructions on separate signal paths to the dispatch controller 242 of the execution unit 226.

Referring back to FIG. 5, the PC pipeline 232 executes each PC arithmetic instruction using one or more selected source operands S2 PCSSOP1 and/or S2 PCSSOP2. In order to do so, the PC pipeline 232 includes the PC arithmetic logic 263 which is configured to process the one or more selected source operands S2 PCSSOP1 and/or S2 PCSSOP2 in a single machine cycle during the operand processing stage S2. Thus, the PC arithmetic instructions are only those arithmetic instructions of the predefined arithmetic type that can be executed in a machine cycle. These are the instructions of the predefined arithmetic instruction type that are most often used and critical to the performance of the CPU 202.

For example, the predefined arithmetic instruction type may identify integer instructions for the SPARC V9 architecture, as described in "The SPARC Architectural Manual", version 9, referenced earlier. In this case, the integer instructions ADD/ADDcc, SUB/SUBcc, AND/ANDcc, ANDN/ANDNcc, OR/ORcc, ORN/ORNcc, XOR/XORcc, XORN/XORNcc, SLL, SRL, SRA, SLLX, SRLX, and SRAX may be classified as the PC arithmetic instructions.

Figure 8:
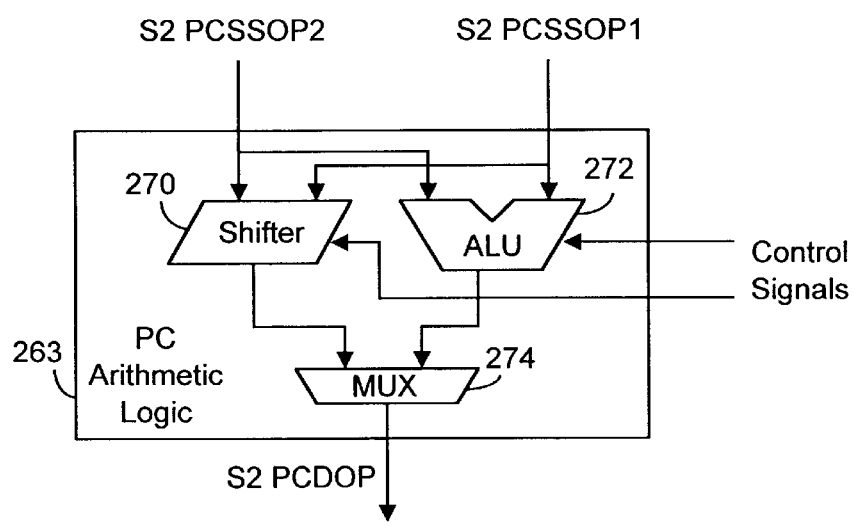
FIG. 8 is a block diagram of the performance critical arithmetic logic of the performance critical pipeline of FIG. 5.

Thus, referring to FIG. 8, the PC arithmetic logic 263 would include a shifter 270 for performing the logical shift operations specified by the integer instructions SLL, SRL, SRA, SLLX, SRLX, and SRAX. It would also include an ALU 274 for performing the add, subtract, logical AND, OR, and XOR, and cc (condition code) update operations specified by the integer instructions ADD/ADDcc, SUB/SUBcc, AND/ANDcc, ANDN/ANDNcc, OR/ORcc, ORN/ORNcc, XOR/XORcc, and XORN/XORNcc. The updated cc would be first stored in a register 276 of the latching logic 262 and then provided to the CCR (condition code register) (not shown) of the execution unit 226. Moreover, the PC arithmetic logic 263 would include a MUX 278 to select the output of the shifter 270 or the ALU 274 as the destination operand S2 PCDOP.

Referring back to FIG. 4, the dispatch controller 242 dispatches the NPC arithmetic instructions to the NPC pipeline 234 for execution. This is done in a similar manner to that described earlier for dispatching PC arithmetic instructions to the PC pipeline 232. Furthermore, in response to decoding each of the NPC arithmetic instructions, the dispatch controller 104 generates control signals in the pipeline stages S1 to S9 for the instruction to control the operation of the WRF 238, the ARF 240, and the PC pipeline 232 in the manner described hereafter.

For each instruction in the NPC pipeline 232, the WRF 238 selectively provides source operands S1 NPCSOP1 and S1 NPCSOP2 from selected registers in the WRF 238 to the NPC pipeline 234 during the operand selection stage S1 for the instruction. This is done in a similar manner to the way in which the source operands S1 PCSOP1 and S1 PCSOP2 are selectively provided to the PC pipeline 232.

Figure 9:
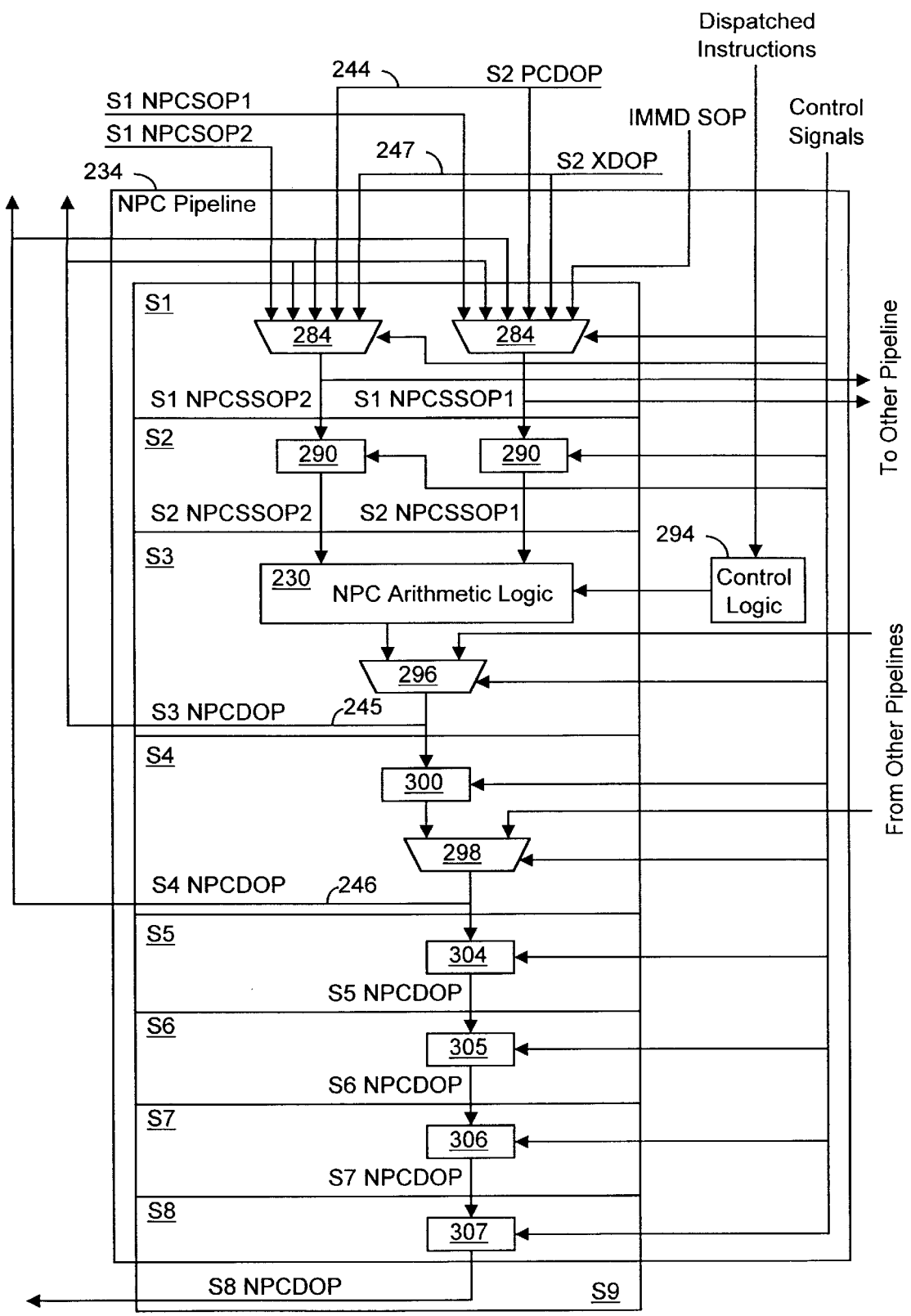
FIG. 9 is a block diagram of a non-performance critical pipeline of the execution unit of FIG. 4.

Referring to FIG. 9, like the PC pipeline 232, the NPC pipeline 234 has an operand selection stage S1, a validity determination stage S7, an ARF write stage S9, and other pipeline stages S4 to S6 and S8 in which other processing is occurring in the execution unit 226. However, unlike the PC pipeline 232, the PC pipeline 234 has two operand processing stages S2 and S3 and a later WRF operand write stage S5 than in the PC pipeline 232. Each of the pipeline stages S1, S2, and S4 to S9 occurs in one machine cycle. But, the operand processing stage S3 occurs in multiple machine cycles with the number of machine cycles varying depending on the instruction being executed.

In the operand selection stage S1 for each instruction in the NPC pipeline 234, the MUXs 284 of the operand selection stage S1 select one or more source operands S1 NPCSSOP1 and/or S1 NPCSSOP2 for processing by the operand processing stages S2 and S3. This selection is made in a similar manner to that described for the MUXs 260 of the PC pipeline 232. But, the selection by the MUXs 284 is made from among the source operands S1 NPCSOP1 and S1 NPCSOP2 received from the WRF 238, the destination operands S2 PCDOP, S3 NPCDOP, S4 NPCDOP, and S2 XDOP received from the operand bypasses 244 to 247, and an immediate source operand IMMD SOP received from the control logic of another pipeline that shares the operand selection stage S1 with the NPC pipeline 234. Thus, like the MUXs 260 of the PC pipeline 232, the MUXs 284 are much less complex than the MUXs 128 of the pipeline 102 of FIG. 1 since they are connected to a reduced number of operand bypasses 244 to 247.

Then, in the operand processing stage S2 for each instruction in the NPC pipeline 234, the one or more selected source operands S1 NPCSSOP1 and/or S1 NPCSSOP2 are latched by one or more of the registers 290 of the operand processing stage S2 as one or more selected source operands S2 NPCSSOP1 and/or S2 NPCSSOP2. Furthermore, the NPC arithmetic logic 230 of the operand processing stage S3 processes the one or more selected source operands S2 NPCSSOP1 and/or S2 NPCSSOP2 in the operand processing stages S2 for the instruction to generate the destination operand S3 NPCDOP. In doing so, the control logic 294 of the NPC pipeline decodes the instruction and generates control signals to control the processing performed by the NPC arithmetic logic 230.

As indicated previously, the NPC pipeline 234 may share the operand selection stage S1 with another pipeline of the execution unit 226. Since the control logic of this other pipeline may be co-located with the execution unit core 228 while the control logic 294 of the NPC pipeline 234 is not, this control logic will provide the immediate source operand IMMD SOP to the operand selection stage S1, as described earlier. Moreover, the one or more selected source operands S2 NPCSSOP1 and/or NPCS2 SSOP2 for an instruction in the NPC pipeline 234 may be provided to this other pipeline for processing in the operand processing stage S2. Similarly, the NPC pipeline 234 may share the pipelines stages S3 to S9 with the other pipeline and the pipeline stages S4 to S9 with still another pipeline of the execution unit 226. Thus, these other pipelines may provide destination operands to the operand processing stages S3 and S4. As a result, the operand processing stages S3 and S4 include MUXs 296 and 298.

For each NPC arithmetic instruction in the NPC pipeline 234, the NPC arithmetic logic 230 will output a destination operand S3 NPCDOP in the operand processing stage S3 for the instruction. When this occurs, the MUX 296 selects the destination operand S3 NPCDOP so that it is provided on the operand bypass 245 and also to the register 300 of the pipeline stage S4. The register 300 latches the destination operand S3 NPCDOP as the destination operand S4 NPCDOP in the operand processing stage S4 for the instruction. Similarly, the MUX 298 selects the destination operand S4 NPCDOP so that it is made available on the operand bypass 246, provided to the WRF 238, and provided to the pipeline stage S4.

The destination operand S4 NPCDOP for each instruction in the NPC pipeline 234 is written to the WRF 238 in the WRF write stage S5 for the instruction. As a result, one of the working registers of the WRF 238 stores the destination operand S4 NPCDOP. This working register corresponds to the architectural register of the ARF 240 that is specified by the instruction as the destination.

The pipeline stages S5 to S8 respectively include registers 304 to 307. Thus, in the pipeline stages S5 to S8 for each instruction in the NPC pipeline 234, the registers 304 to 307 respectively latch the destination operands S4 NPCDOP to S7 PCDOP that were respectively generated or latched in the previous pipeline stages S4 to S7 as respectively the destination operands S5 NPCDOP to S8 NPCDOP.

Furthermore, the dispatch controller 242 determines whether each instruction in the NPC pipeline 234 is valid or invalid in the validity determination stage S7 for the instruction in the same manner that it is done for the PC pipeline 232. Thus, for each instruction in the NPC pipeline 234 that is determined to be valid by the dispatch controller 242, the destination operand S8 NPCDOP is stored in the ARF 240 in the ARF operand write stage S9 for the instruction. Specifically, the architectural register in the ARF 240 that is specified by the instruction as the destination stores the destination operand S8 NPCDOP.

As indicated previously, the PC arithmetic logic 230 is configured to process the one or more selected source operands S2 NPCSSOP1 and/or S2 NPCSSOP2 in multiple machine cycles during the operand processing stage S3. Thus, the NPC arithmetic instructions are those arithmetic instructions of the predefined arithmetic type discussed earlier that are more complex and need to be executed in more than just one machine cycle. In other words, these are the instructions of the predefined arithmetic instruction type that are not used often and are therefore not critical to the performance of the CPU 202.

To illustrate this point, the previous example may be used where the predefined arithmetic instruction type identifies the integer instructions for the SPARC V9 architecture. In this case, the integer instructions ADDC/ADDCcc, SUBC/SUBCcc, TADDcc/TADDccTV, TSUBcc/TSUBccTV, EDGE, MULScc, SMUL/SMULcc, UMUL/UMULcc, MULX, SDIV/SDIVcc, UDIV/UDIVcc, SPIVX, and UDIVX may be classified as the NPC arithmetic instructions. Thus, the NPC arithmetic logic 230 would include accumulation logic 306, multiply logic 308, and divide logic 310 as shown in FIGS. 10 to 12.

Figure 10:
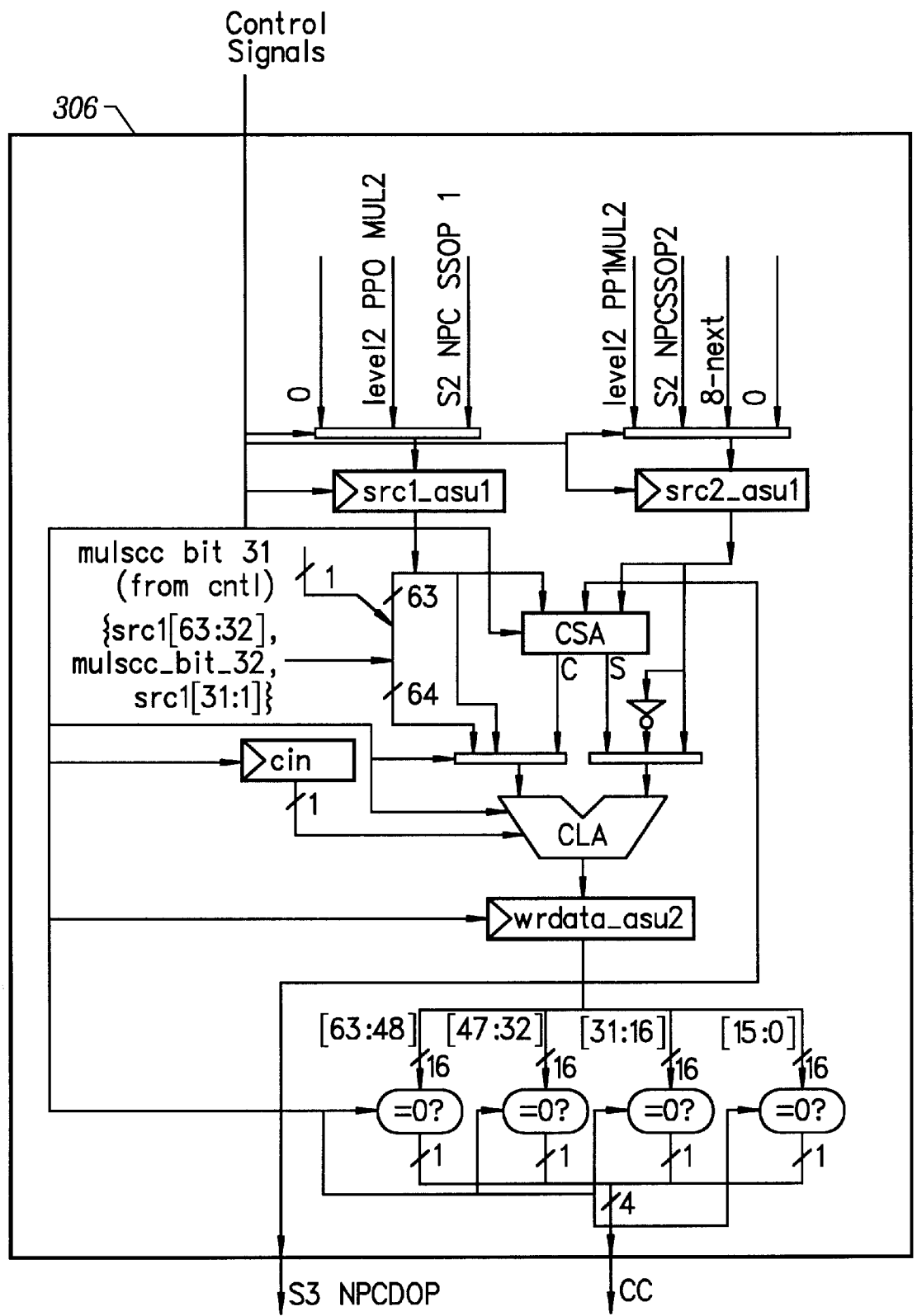
FIG. 10 is a block diagram of the accumulation logic of the non-performance critical pipeline of FIG. 9.

Referring to FIG. 10, only the accumulation logic 306 is used to execute the integer instructions ADDC/ADDCcc, SUBC/SUBCcc, TADDcc/TADDccTV, TSUBcc/TSUBccTV, and EDGE. For each of these instructions, the accumulation logic 306 processes the one or more selected source operands S2 NPC SSOP1 and/or S2 NPC SSOP2 in accordance with the instruction to generate the destination operand S3 NPCDOP.

For executing the integer instructions EDGE, ADDC, SUBC, TADDcc/TADDccTV, and TSUBcc/TSUBccTV, the operand processing stage S3 of the NPC pipeline 234 takes three machine cycles. This is done with two helper instructions dispatched by the dispatch controller 242. Similarly, four machine cycles are needed by the operand processing stage S3 for executing the integer instructions ADDCcc and SUBCcc. In this case, three helper instructions are dispatched by the dispatch controller 242.

Figure 11:
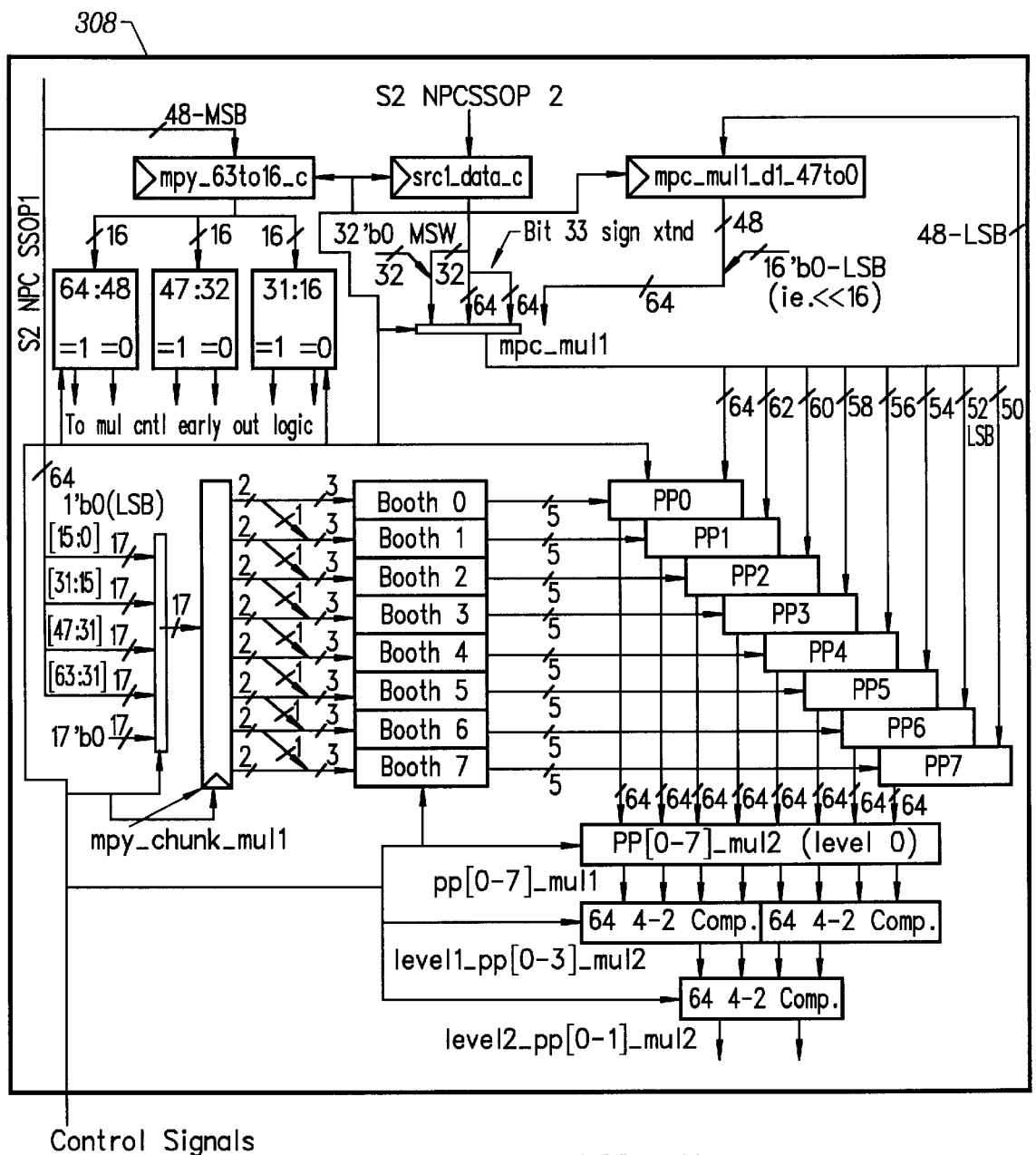
FIG. 11 is a block diagram of the multiply logic of the non-performance critical pipeline of FIG. 9.
Figure 12:
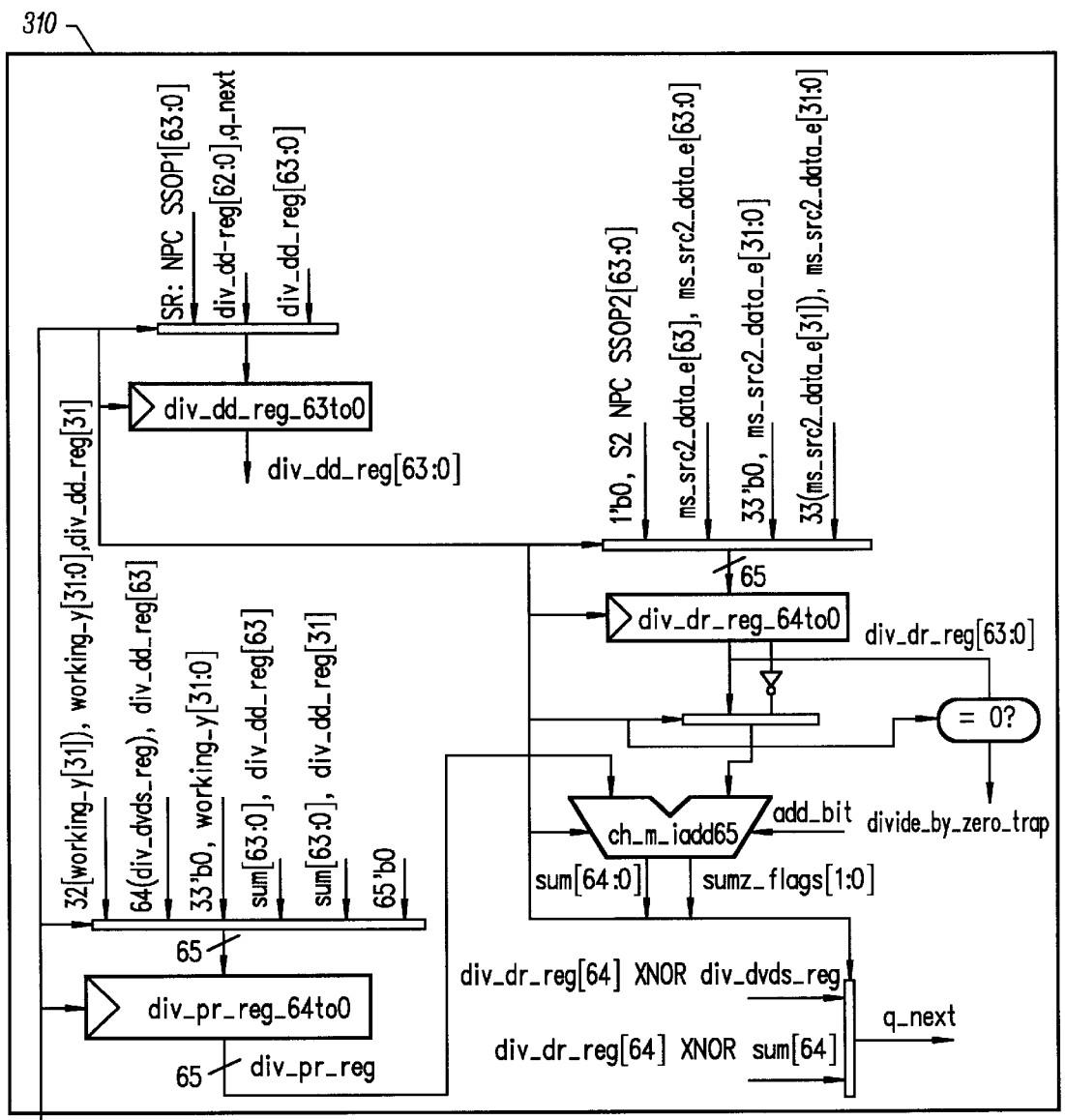
FIG. 12 is a block diagram of the divide logic of the non-performance critical pipeline of FIG. 9.

As shown in FIGS. 10 and 11, the accumulation logic 306 and the multiply logic 308 are used to execute the integer instructions MULScc, SMUL/SMULcc, UMUL/UMULcc, and MULX. For each of these instructions, the multiply logic 306 processes the selected source operands S2 NPC SSOP1 and S2 NPC SSOP2 in accordance with the instruction to generate the partial products level2$_{13}$ PP1__MUL2 and level2__PP2__MUL2. Then, the accumulation logic 306 accumulates the partial products level2__PP1__MUL2 and level2__PP2__MUL2 to generate the destination operand S3 NPCDOP.

As a result, four machine cycles are needed by the operand processing stage S3 of the NPC pipeline 234 for executing the integer instruction MULScc using three helper instructions dispatched by the dispatch controller 242. For executing the integer instructions SMUL and UMUL, four or five machine cycles are used by the operand processing stage S3 with three or four helper instructions dispatched by the dispatch controller 242. Similarly, five or six machine cycles are needed by the operand processing stage S2 for executing the integer instructions SMULcc and UMULcc using four or five helper instructions dispatched by the dispatch controller 242. And finally, between four and seven machine cycles are needed by the operand processing stage S2 for executing the integer instruction MULX using between three and six helper instructions dispatched by the dispatch controller 242.

Referring now to FIGS. 10 and 12, the accumulation logic 306 and the divide logic 310 are used to execute the integer instructions SDIV/SDIVcc, UDIV/UDIVcc, SPIVX, and UDIVX. For each of these instructions, the divide logic 306 processes the selected source operands S2 NPC SSOP1 and S2 NPC SSOP2 in accordance with the instruction to generate the quotient q__next. Then, the accumulation logic 306 outputs the quotient q__next as the destination operand S3 NPCDOP.

Here, thirty four or thirty five machine cycles are used by the operand processing stage S3 of the NPC pipeline 234 for executing the integer instructions SDIV and UDIV using thirty three or thirty four helper instructions dispatched by the dispatch controller 242. For executing the integer instructions SDIVcc and UDIVcc, thirty five or thirty six machine cycles are used by the operand processing stage S3. This is done with thirty four or thirty five helper instructions dispatched by the dispatch controller 242. Furthermore, sixty six machine cycles are used by the operand processing stage S3 for executing the integer instructions SDIVX and UDIVX using sixty five helper instructions dispatched by the dispatch controller 242.

From the foregoing, it is clear that the NPC arithmetic logic 230 and its control logic 294 are complex and occupy a large amount of space in the CPU 202. As a result, the NPC arithmetic logic 230 and the control logic 294 are not co-located with the execution unit core 228, as shown in FIG. 3 and mentioned earlier. Referring also to FIGS. 4 and 7, the execution unit core 228 comprises the dispatch controller 242, the register file 236, the entire PC pipeline 232, the pipeline stages S1 and S4 to S9 of the NPC pipeline 234, the MUX 296 of the operand processing stage S3 of the NPC pipeline 234, the operand bypasses 244 to 247, and any other pipeline of the execution unit 226.

Thus, by remotely locating the large and complex NPC arithmetic logic 230 and its large and complex control logic 294 away from the execution unit core 228, the performance of the PC pipeline 232 is improved. This is clear in that the PC pipeline 232, the dispatch controller 242, the WRF 238, and the ARF 240 are all in close proximity to each other.

Specifically, referring to FIG. 5, the signal paths 316 are used to transfer the selected source operands S2 PCSSOP1 and S2 PCSOP2 between the registers 256 of the operand processing stage S2 to the PC arithmetic logic 263 of the PC pipeline 232. The propagation time on the signal paths 316 is negligible. This is due to the operand selection and operand processing stages S2 and S3 of the PC pipeline 232 being co-located. As a result, the selected source operands S2 PCSSOP1 and S2 PCSOP2 can be processed by the PC arithmetic logic 263 in the same machine cycle that they are latched by the registers 256. Here, each machine cycle is approximately 1700 ps (picoseconds). Thus, there is no other pipeline stage between the operand selection and operand processing stages S1 and S2 since one is not needed to provide the selected source operands S2 PCSSOP1 and S2 PCSOP2 to the PC arithmetic logic 263.

Turning now to FIG. 9, the signal paths 318 are used to transfer the selected source operands S1 NPCSSOP1 and S1 NPCSSOP2 between the registers 290 and the NPC arithmetic 292 of the NPC pipeline 234. However, as just indicated, the NPC arithmetic 292 is not co-located with the execution unit core 228 since the performance of the NPC pipeline 234 is not as critical as that of the PC pipeline 232. The propagation time on the signal paths 318 is therefore much longer than that of the signal paths 316 and is approximately 1000 ps. Thus, if the re was no other pipeline stage between the operand selection and processing stages S1 and S3, only about 700 ps would be left in the first machine cycle of the operand processing stage S3 for the NPC arithmetic logic 292 to begin processing of the selected source operands S1 NPCSSOP1 and S1 NPCSSOP2. Therefore, the propagation stage S2 must be added to provide the selected source operands S1 NPCSSOP1 and S1 NPCSSOP2 to the NPC arithmetic logic 292 in one machine cycle so that the NPC arithmetic logic 292 has a first full machine cycle in the operand processing stage S3 in which to begin processing of the selected source operands S1 NPCSSOP1 and S1 NPCSSOP2. As those skilled in the art will recognize, additional propagation stages may be added if the signal paths 318 have a propagation time even longer than that just described.

Conclusion

While the present invention has been de scribed with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A central processing unit of a computer, comprising:
an issue unit to issue instructions;
an execution unit comprising:
 a dispatch controller configured to dispatch instructions for execution and to determine whether each of the dispatched instructions is valid or invalid;
 a pipeline configured to execute each of the dispatched instructions by selecting one or more operands and generating an operand in response;
 operand sources to provide operands from which the selected one or more operands for each of the dispatched instructions are selected, the operand sources including a working register file configured to store the generated operand for each of the executed instructions before the instruction is determined to be invalid or valid such that the stored operand may be subsequently provided by the working register file as one of the selected one or more operands for one of the dispatched instructions, wherein the working regisler file is coupled to the pipeline to receive the generated operand for each of the executed instructions before the instruction is determined to be invalid or valid,
 an architectural register file configured to store the generated operand for each of the executed instructions that is determined to be valid by the dispatch controller after the instruction has been determined to be valid and to transfer operands currently stored therein when one of the dispatched instructions is determined to be invalid, wherein the architectural register file is coupled to the pipeline to receive the generated operand for each of the executed instructions that is determined to be valid after the instruction is determined to be valid,
 the working register file also being configured to receive and store the transferred operands such that the working register file is placed back in a state that it was in just before execution of the invalid instruction; wherein
  the pipeline has multiple pipeline stages for executing each of the executed instructions including a working register file write stage, a validity determination stage after the working register file write stage, and an architectural register file write stage after the validity determination stage;
  the generated operand for each of the executed instructions is received from the pipeline and stored in the working register file during the working register file write stage;
  each of the executed instructions is determined to be valid or invalid during the validity determination stage; and
  the generated operand for each of the executed instructions is received from the pipeline and stored in the architectural register file during the architectural register file write stage.

2. The central processing unit of claim 1 wherein:
the architectural register file includes register windows with only one of the register windows being current at a time;
the generated operand for each of the executed instructions is stored in the architectural register file in the one of the register windows that is current at the time; and
the transferred operands are transferred from the one of the register windows that is current at the time.

3. The central processing unit of claim 1 wherein:

the operand sources do not include the architectural register file and do not include an operand bypass for any of the pipeline stages that occur after the working register file write stage; and the pipeline stages also include an operand selection stage in which the selected one or more operands for each of the executed instructions are selected.

4. A method of executing instructions in a central processing unit of a computer, the method comprising the steps of:

dispatching the instructions to a pipeline for execution;

providing operands with operand sources that include a working register file;

executing each of the dispatched instructions in the pipeline by selecting one or more operands from among the provided operands and generating an operand in response;

determining whether each of the dispatched instructions is valid or invalid;

storing the generated operand for each of the executed instructions in the working register file before the instruction is determined to be invalid or valid such that the stored operand may be subsequently provided by the working register file as one of the selected one or more operands for one of the dispatched instructions;

storing the generated operand for each of the executed instructions that is determined to be valid in an architectural register file after the instruction has been determined to be valid;

transferring operands currently stored in the architectural register file when one of the executed instructions is determined to be invalid; and storing the transferred operands in the working register file such that the working register file is placed back in a state that it was in just before execution of the invalid instruction;

providing the generated operand for each of the executed instructions from the pipeline to the working register file before the instruction is determined to be invalid or valid; and providing the generated operand for each of the executed instructions that is determined to be valid from the pipeline to the architectural register file after the instruction is determined to be valid; wherein:

the pipeline has multiple pipeline stages for executing each of the executed instructions including a working register file write stage, a validity determination stage after the working register file write stage, and an architectural register file write stage after the validity determination stage;

the providing and storing steps for the working register file occur during the working register file write stage;

the step of determining whether each of the executed instructions is valid or invalid occurs during the validity determination stage;

the providing and storing steps for the architectural register file occur during the architectural register file write stage.

5. The method of claim 4 wherein:

the architectural register file includes register windows with only one of the register windows being current at a time;

in the second storing step, the generated operand for each of the executed instructions is stored in the architectural register file in the one of the register windows that is current at the time;

in the transferring step, the transferred operands are transferred from the one of the register windows that is current at the time.

6. The method of claim 4 further comprising the steps of:

providing the generated operand for each of the executed instructions from the pipeline to the working register file before the instruction is determined to be invalid or valid; and providing the generated operand for each of the executed instructions that is determined to be valid from the pipeline to the architectural register file after the instruction is determined to be valid.

7. The method of claim 4 wherein:

the operand sources do not include the architectural register file and do not include an operand bypass for any of the pipeline stages that occur after the working register file write stage; and the pipeline stages also include an operand selection stage in which the selected on or more operands for each of the executed instructions are selected.

8. An execution unit in a computer, comprising:

a dispatch controller configured to dispatch instructions for execution and to determine whether each of the dispatched instructions is valid or invalid;

a pipeline configured to execute each of the dispatched instructions by selecting one or more operands and generating an operand in response;

operand sources to provide operands from which the selected one or more operands for each of the dispatched instructions are selected the operand sources including a working register file configured to store the generated operand for each of the executed instructions before the instruction is determined to be invalid or valid such that the stored operand may be subsequently provided by the working register file as one of the selected one or more operands for one of the dispatched instructions, wherein the working register file is coupled to the pipeline to receive the generated operand for each of the executed instructions before the instruction is determined to be invalid or valid;

an architectural register file configured to store the generated operand for each of the executed instructions that is determined to be valid and to transfer operands currently stored therein when one of the dispatched instructions is determined to be invalid, wherein the architectural register file is coupled to the pipeline to receive the generated operand for each of the executed instructions that is determined to be valid after the instruction is determined to be valid;

the working register file also being configured to receive and store the transferred operands such that the working register file is placed back in a stage that it was in just before execution of the invalid instruction; wherein:

the pipeline has multiple pipeline stages for executing each of the executed instructions including a working register file write stage, a validity determination stage after the working register file write stage, and an architectural register file write stage after the validity determination stage;

the generated operand for each of the executed instructions is received and stored in the working register file during the working register file write stage;

each of the executed instructions is determined to be valid or invalid during the validity determination stage; and the generated operands for each of the executed instructions is received and stored in the architectural register file during the architectural register file write stage.

9. The execution unit of claim 8 wherein:

the architectural register file includes register windows with only one of the register windows being current at a time;

the generated operand for each of the executed instructions is stored in the architectural register file in the one of the register windows that is current at the time; and the transferred operands are transferred from the one of the register windows that is current at the time.

10. The execution unit of claim 8 wherein:

the working register file is coupled to the pipeline to receive the generated operand for each of the executed instructions before the instruction is determined to be invalid or valid; and the architectural register file is coupled to the pipeline to receive the generated operand for each of the executed instructions that is determined to be valid after the instruction is determined to be valid.

11. The execution unit of claim 8 wherein:

the operand sources do not include the architectural register file and do not include an operand bypass for any of the pipeline stages that occur after the working register file write stage; and the pipeline stages also include an operand selection stage in which the selected one or more operands for each of the executed instructions are selected.

* * * * *

UNITED STATES PATENT AND TRADEMARK OFFICE
CERTIFICATE OF CORRECTION

PATENT NO. : 5,964,862

DATED : October 12, 1999

INVENTOR(S) : Leung et al.

It is certified that error appears in the above-identified patent and that said Letters Patent is hereby corrected as shown below:

Column 16, line 21, replace "regisler" with --register--;
Column 16, line 63, delete the second occurrence of "the";
Column 16, line 65, delete the second occurrence of "the";
Column 18, line 1, delete the first occurrence of "the";
Column 18, line 4, delete the first occurrence of "the";
Column 18, line 21, replace "on" with --one--;
Column 19, line 13, delete the second occurrence of "the"; and
Column 19, line 15, delete the second occurrence of "the".

Signed and Sealed this

Eleventh Day of July, 2000

*Attest:*

Q. TODD DICKINSON

*Attesting Officer*   *Director of Patents and Trademarks*